Oct. 27, 1959 G. V. MORRIS 2,910,553

SUBSCRIPTION TELEVISION ENCODING APPARATUS

Filed Feb. 20, 1953 5 Sheets-Sheet 1

GEORGE V. MORRIS
INVENTOR.

BY Francis W. Crotty

HIS ATTORNEY.

Oct. 27, 1959 G. V. MORRIS 2,910,553

SUBSCRIPTION TELEVISION ENCODING APPARATUS

Filed Feb. 20, 1953 5 Sheets-Sheet 2

GEORGE V. MORRIS
*INVENTOR.*

BY Francis W. Crotty

HIS ATTORNEY.

SUBSCRIPTION TELEVISION ENCODING APPARATUS

Filed Feb. 20, 1953 5 Sheets-Sheet 3

GEORGE V. MORRIS
*INVENTOR.*

BY Francis W. Crotty

HIS ATTORNEY.

Oct. 27, 1959 G. V. MORRIS 2,910,553

SUBSCRIPTION TELEVISION ENCODING APPARATUS

Filed Feb. 20, 1953 5 Sheets-Sheet 4

GEORGE V. MORRIS
*INVENTOR.*

BY Francis W. Crotty

HIS ATTORNEY.

GEORGE V. MORRIS
*INVENTOR.*

BY Francis W. Crotty

HIS ATTORNEY.

2,910,553

SUBSCRIPTION TELEVISION ENCODING APPARATUS

George V. Morris, Chicago, Ill., assignor to Zenith Radio Corporation, a corporation of Delaware Application February 20, 1953, Serial No. 338,032

7 Claims. (Cl. 200—46)

This invention pertains to encoding apparatus for a subscription television system in which a television signal is transmitted in coded form for use in such subscriber receivers as are controlled in accordance with a coding schedule employed at the transmitter.

Since the invention may be practiced in either a transmitter or receiver, the term "encoding" has been used herein in its generic sense to encompass either coding at the transmitter or decoding at the receiver.

In several proposed subscription television systems, a key signal is transmitted in conjunction with or as a part of the usual television signal; this key signal preferably conveys only a portion of the information necessary to decode and reproduce the telecast in an intelligible fashion. The remainder of the decoding information must then be supplied by apparatus included in the subscriber receiver. Typical examples of this type of system are described and claimed in the copending applications of Walter S. Druz, Serial No. 249,262, filed October 2, 1951, now abandoned; George V. Morris et al., Serial No. 281,418, filed April 9, 1952, and issued July 15, 1958 as Patent No. 2,843,656; and Jack E. Bridges, Serial No. 326,107, filed December 15, 1952, and issued Feb. 11, 1958 as Patent No. 2,823,252, all of which are assigned to the same assignee as the present invention. Systems of this general class are characterized by a code transmission link between the transmitter and subscriber receivers which permits the use of a random coding schedule and at the same time enables the decoding apparatus of the receiver to continuously decipher the coded telecast.

In order to maintain an adequate degree of secrecy and prevent the unauthorized interchange of decoding information, it has been proposed that the decoding system of the receiver include apparatus having a plurality of operating conditions for establishing a corresponding plurality of operating modes in the receiver. This apparatus includes an actuating system, usually a multivibrator, which is responsive to an applied control signal and which selectively actuates a decoder incorporated in the receiver and establishes the receiver in one of its possible operating modes as determined by the control signal. The control signal may be derived during each of a multiplicity of mode-determining intervals, and, in one instance, includes a series of components or pulses selectively representing a particular code pattern which determines the mode of operation of the receiver for the ensuing interval. The control signal may be developed in the receiver from a key signal which is distributed as a modulation component of the coded telecast; the key signal is demodulated and applied to a selector mechanism which produces a control signal representing a code pattern determined conjointly by the key signal and the characteristics of the selector mechanism. The control signal thus developed is applied to the receiver actuating apparatus to condition the receiver for operation in a particular mode, as described above.

One type of selector mechanism, described in the aforementioned Morris et al. application, includes a plurality of input terminals and a plurality of output terminals and means for individually selectively interconnecting those terminals; a similar system is employed in the Bridges' application. A system of this type makes it possible to select desired portions of the transmitted key signal while at the same time avoiding any adverse effects which might result from the presence of key signal components intended for use in other receivers or provided to confuse unauthorized decoding. However, operation of individual switches of the type shown in these disclosures requires several manipulations on the part of the subscriber in order to condition his receiver for reproduction of a selected telecast. Accordingly, it has been found desirable to provide a selector mechanism which, in response to a simple functional operation or manipulation, will condition a subscriber receiver for operation in response to a particular code pattern.

It is an object of the present invention, therefore, to provide a new and improved encoding apparatus for selectively establishing a multiplicity of circuit conditions between a plurality of input terminals and a plurality of output terminals incorporated in that system.

It is a further object of the invention to provide an improved encoding apparatus for a subscriber television system which permits utilization of a wide variety of individual code patterns.

It is an additional object of the invention to provide an improved encoding apparatus which may be conditioned for reception of a telecast, coded in accordance with a preselected coding schedule, by means of a single functional operation.

It is a corollary object of the invention to provide an encoding apparatus which is relatively simple and expedient to construct and economical to manufacture.

The encoding apparatus of the invention is adapted for use in a subscription television system including a plurality of input terminals and a plurality of output terminals; this encoding apparatus comprises a plurality of transition devices, individually actuable from a first operating condition to a second operating condition, for selectively establishing a multiplicity of circuit conditions between the input and output terminals. A first encoding device is incorporated in the apparatus and includes a plurality of code bars collectively defining a selected one of a first family of predetermined code patterns. The code bars are individually movable from a reference position to a second position to selectively actuate a predetermined number of the transition devices. The encoding apparatus further includes a second encoding device for selectively moving the code bars from their reference position to their second position in accordance with a selected one of a second family of predetermined code patterns, the code patterns of the first and second encoding devices conjointly determining the circuit conditions established between the input and output terminals of the system.

The features of the invention which are believed to be novel are set forth with particularity in the appended claims. The organization and manner of operation of the invention itself, together with further objects and advantages thereof, may best be understood by reference to the following description taken in conjunction with the accompanying drawings, in which:

Figure 1:
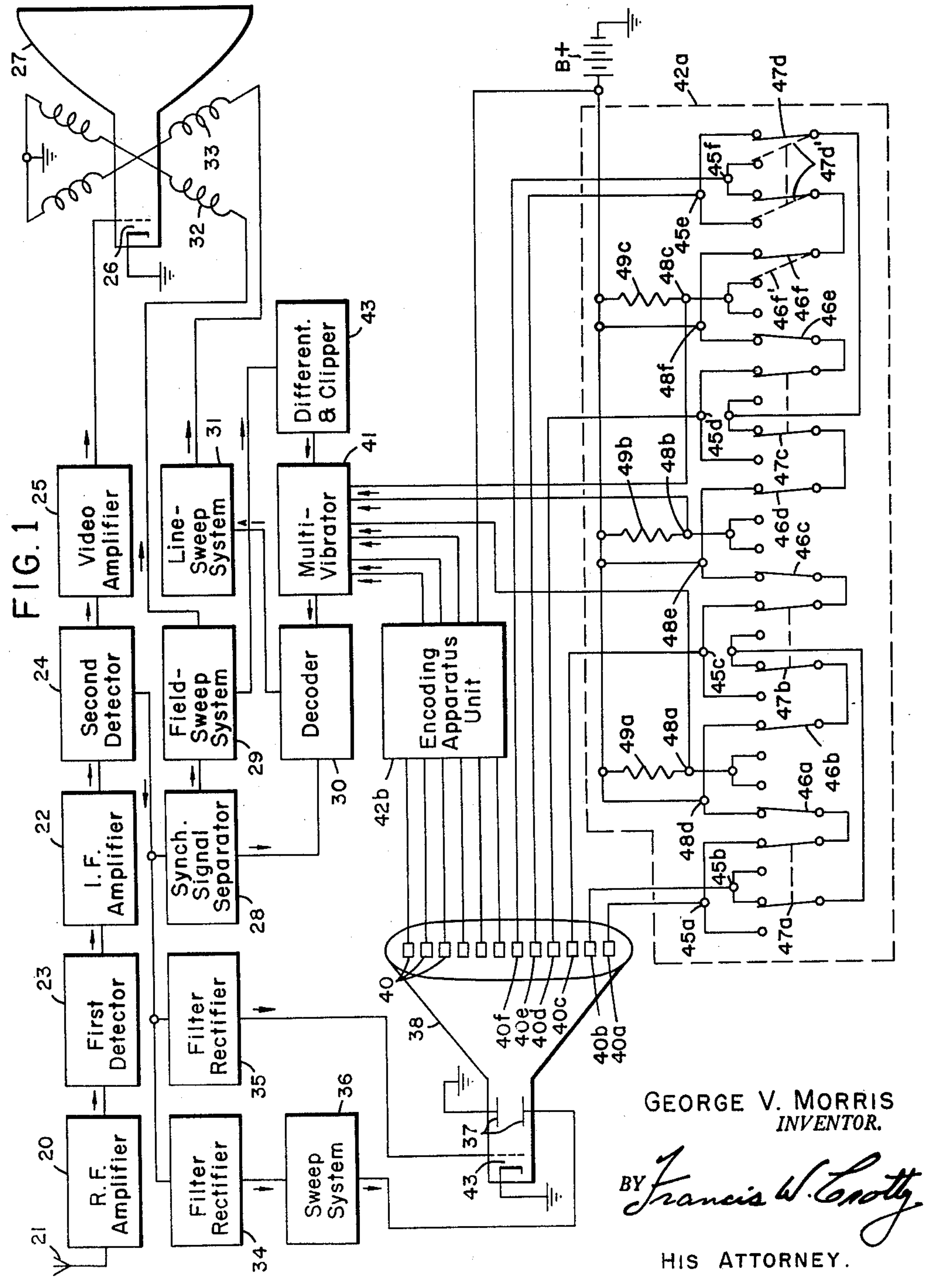
Figure 1 is a schematic diagram of a subscription television receiver including the encoding apparatus of the instant invention.

In Figure 1, the apparatus illustrated comprises a subscription television receiver constructed in accordance with the teaching of the above-noted Morris et al. application, Serial No. 281,418. This system is selected purely for convenience; it will be readily apparent to those skilled in the art that the encoding apparatus of the invention may be readily applied to any subscription system of the same general type, including those of the previously noted Druz et al. and Bridges applications.

The receiver of Figure 1 comprises a radio-frequency amplifier 20 of one or more stages having input terminals connected to an antenna 21 and output terminals coupled to an intermediate-frequency amplifier 22 through a first detector 23. Amplifier 22, which may have any desired number of stages, is coupled to a second detector 24 which, in turn, is coupled through a video amplifier 25 to the input electrodes 26 of a cathode-ray image-reproducing device 27. Second detector 24 is also connected to a synchronizing-signal separator 28; separator 28 is coupled to a field-sweep system 29 and, through a decoder 30, to a line-sweep system 31. The output terminals of sweep systems 29 and 31 are connected to field-deflection elements 32 and line-deflection elements 33 respectively of image-reproducing device 27. Second detector 24 is also connected to a first filter and rectifier 34 and to a second filter-rectifier 35. Rectifier 34 is coupled to a sweep system 36, the output terminals of which are coupled to the deflection elements 37 of a cathode-ray commutator device 38, whereas rectifier-filter 35 is coupled to the input electrodes 43 of the commutator. Commutator 38 includes a plurality of target elements or anodes 40 which are coupled to a multivibrator 41 through a transition apparatus including two identical units 42_a_ and 42_b_. Multivibrator 41 is also coupled to field sweep system 29 through a differentiator and clipper 43.

The apparatus of Figure 1, as thus far described, is generally the same as that of the subscription television receiver described and claimed in the above-noted Morris et al. application; accordingly, a detailed description of its operation is deemed unnecessary. Briefly, a subscription telecast received at antenna 21 is translated through amplifier 20, detector 23, and amplifier 22, in the usual manner, to second detector 24. The detected telecast is supplied to separator 28, which segregates the field-synchronizing pulses included in the telecast; these synchronizing pulses are applied to sweep system 29 and are used to synchronize the field deflection of image-reproducing device 27 in the usual manner. Similarly, the line-synchronizing pulses contained in the detected telecast are supplied to sweep system 31 to control a line-deflection signal developed in system 31 and maintain that signal in synchronism with the transmitter line-scanning frequency.

As noted in the Morris et al. application referred to above, time variations between the video and line-synchronizing components of the television signal, which are introduced at the transmitter, must be compensated in the receiver; this compensation is effected by actuating decoder 30 in time coincidence with the actuation of a similar coder at the transmitter. Filter-rectifier 34 selects a portion of a key signal incorporated in the telecast and derives therefrom a series of timing pulses which are supplied to sweep system 36 to control deflection elements 37 in synchronism with a commutator device, similar to commutator 38, employed at the transmitter. Filter 35 selects a second series of pulses included in the key signal and supplies them to input electrodes 43. Accordingly, the electron beam developed in commutator 38 is modulated and deflected in accordance with the modulation and deflection applied to a similar device included in the subscription television transmitter of this particular system. Commutator 38 develops a series of signals or pulses which are selectively transmitted to multivibrator 41 through apparatus 42_a_, 42_b_, as will be more completely described hereinafter. Differentiator and clipper 43 is used to derive a restoring pulse from the leading edge of each field-synchronizing pulse to return multivibrator 41 to a reference operating condition at selected intervals. Multivibrator 41, as controlled by the signals applied from device 38 and clipper 43, regulates the operation of decoder 30 to maintain the receiver in synchronism, insofar as the line-sweep intervals are concerned, with the transmitter.

All of the apparatus of the receiver of Figure 1 is described in the aforementioned Morris et al. application, with the exception of the transition apparatus comprising units 42_a_ and 42_b_. In unit 42_a_, a plurality of input terminals 45, separately designated 45_a_, 45_b_, 45_c_, 45_d_, 45_e_, and 45_f_, are individually connected to similarly designated anodes 40 of commutator 38. Unit 42_a_ comprises a plurality of transition devices of two distinct types, the first of these types being direct-transition switches 46, which are separately marked 46_a_, 46_b_, 46_c_, 46_d_, 46_e_ and 46_f_ respectively. The second type of transition device incorporated in encoding apparatus unit 42_a_ comprises transposition switches 47, separately denoted 47_a_, 47_b_, 47_c_ and 47_d_; transposition switches 47 are of the double-pole double-throw type, whereas direct-transition switches 46 are of the single-pole double-throw type. A plurality of output terminals 48, individually denoted 48_a_, 48_b_, 48_c_, 48_d_, 48_e_ and 48_f_, are also provided for unit 42_a_, terminals 48_d_, 48_e_ and 48_f_ being connected directly to a source of biasing potential B+ which is in turn coupled to a plane of reference potential (ground). The other three output terminals, 48_a_, 48_b_, and 48_c_, are each individually coupled to bias source B+ through one of three load resistors 49_a_, 49_b_ and 49_c_. Output terminals 48_a_, 48_b_ and 48_c_ are also coupled to multivibrator 41. It should be noted that the provision for three separate output impedances represents a slight deviation from the apparatus disclosed in the aforementioned Morris et al. application, which employs a single input channel for multivibrator 41; if an arrangement of that type is desired, resistors 49 may be replaced by a single load impedance, provided output terminals 48_a_, 48_b_ and 48_c_ are suitably connected together.

With transition devices 46 and 47 in the positions indicated, encoding apparatus unit 42_a_ is in a reference operating condition in which it establishes a direct electrical connection between each of the anodes 40_a_–40_f_ and source B+. Accordingly, no current flows through any of the load impedances 49 and no pulses are transmitted to multivibrator 41. In describing the general effect of unit 42_a_ upon the receiver, it is first assumed that direct-transition switch 46_f_ is displaced to the position indicated by dash line 46_f′_. When this is done, anode 40_f_ is disconnected from bias source B+ and is reconnected thereto through load impedance 49_c_. Thus, whenever the electron beam developed in commutator 38 effectively impinges upon anode 40_f_ it initiates a current between source B+ and anode 40_f_ through load impedance 49_c_; this current develops a voltage pulse or signal which is supplied through output terminal 48_c_ to multivibrator 41. Similarly, whenever any one of the direct-transition switches 46 is thrown to its analogous operating position, it establishes a connection between a selected one of the anodes 40 and a selected one of load impedances 49; in other words, the direct-transition switches are effectively individually actuable from a first operating condition to a second operating condition to selectively establish a multiplicity of circuit conditions between input terminals 45 and output terminals 48.

Still assuming that switch **46*f* is in position 46*f*', it is now further assumed that transposition switch 47*d* is actuated to the position indicated by dash lines 47*d*'. Examination of the circuit connections indicates that input terminal 45*f* and its associated anode 40*f* are now restored to their original operating condition, the direct connection between the anode and source B+ now being made through switches 47*c* and 46*d* and output terminal 48*e*. However, input terminal 45*e* and its associated anode 40*e* are no longer directly coupled to source B+; rather, input terminal 45*e* is coupled to source B+ through switch 46*f*, output terminal 48*c*, and load impedance 49*c*. Accordingly, transposition switch 47*d*, which is inter-connected between input terminals 45*e* and 45*f* and transition switches 46*f* and 46*d*, is individually actuable from a first operating condition to a second operating condition in which it effectively transposes the terminal circuit conditions established by the direct-transition switches. In effect, transition switches 46 and transposition switches 47 may be jointly described as transition devices which are individually actuable to selectively establish a wide variety of circuit conditions between input terminals 45 and output terminals 48. The overall effect upon the operation of a subscription television system which may be achieved by selective operation of the transition devices varies considerably; inasmuch as a wide variety of such effects are described in the above-noted copending applications and in other publications readily available to those skilled in the art, no detailed discussion thereof will be included here. In the described receiver, the transition devices included in apparatus units 42*a* and 42*b* select predetermined portions of the key signal included in the received telecast and supply those portions to multivibrator 41 to condition decoder 30 to a desired operating mode; in effect, units 42*a* and 42*b*** impose a receiver code pattern upon the received key signal.

Figures 2, 4:
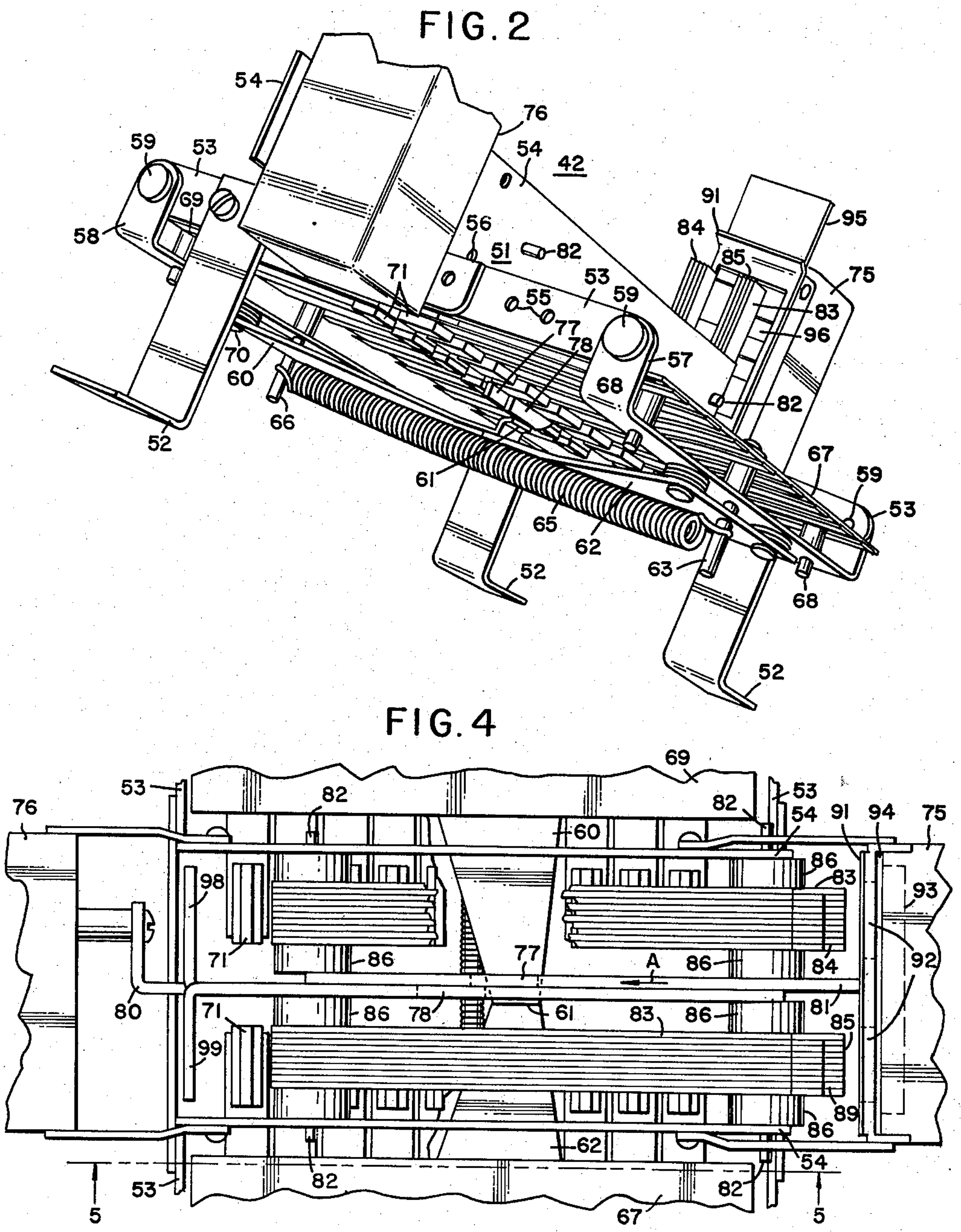
Figure 2 is a perspective view of one embodiment of the invention.
Figure 4 is a top view of a portion of the apparatus of Figure 1.

The perspective view of Figure 2 shows an encoding apparatus 42 including units **42*a* and 42*b* (Figure 1) and comprising a frame 51 having legs 52, cross members 53, and a pair of guide members 54. One of the legs 52, which would normally be mounted on the frame by means of threaded openings 55, has been removed in order to give a clearer picture of the remainder of the apparatus; a portion of one of the guide members 54 normally affixed to the frame by screws threaded in openings 56 has also been removed for similar reasons. A pair of support brackets 57, 58 are pivotally mounted on cross members 53 by means of four pivot pins 59; a first actuating lever 60 is coupled to bracket 58 and extends toward bracket 57, terminating in a cam section 61 positioned in the center of the apparatus. A second actuating lever 62 is similarly affixed to support bracket 57 and extends toward and engages the under surface of lever 60. A mounting post 63 is affixed to bracket 57 and extends through lever 62, a biasing spring 65 being coupled between post 63 and a similar post 66 affixed to the bracket 58 and extending through lever 60. A first base member 67 is rigidly mounted on post 63 and is also affixed to bracket 57 by means of a pair of support members 68. A similar base 69 is rigidly mounted on post 66 and is also affixed to bracket 58 by means of a pair of support members 70. Bases 67, 69 extend in the same direction as levers 62 and 60 respectively and serve as supports for a plurality of switches each including an actuator 71**.

Figure 3:
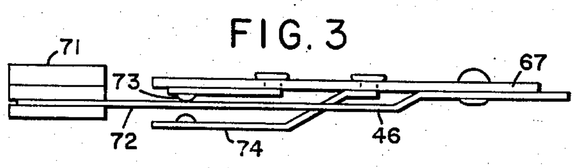
Figure 3 illustrates one type of switch employed in the apparatus of Figure 1.

The switch and base arrangement is more clearly shown in Figure 3, which illustrates a single-pole double-throw switch corresponding to one of the direct transition switches 46 of Figure 1 mounted on base 67. Switch 46 comprises a switch arm 72, including actuator 71, a first contact member 73, and a second contact member 74, all of which are mounted on base 67. Switch arm 72 is made of resilient conductive material and is normally self-biased into contact with member 73, which may be considered to correspond to one of the output terminals **48*d*, 48*e*, or 48*f* of Figure 1. However, arm 72 is movable to a second operating position in which it no longer engages contact 73 but in which contact is established with member 74, which corresponds to one of the output terminals 48*a*, 48*b*, or 48*c* of Figure 1. It will be apparent that this change in operating positions may be accomplished by effecting a relative movement between base 67 and switch arm 72**.

Returning to Figure 2, it is seen that a first operating member, handle 75, is mounted at one extremity of guide members 54 and that a second operating member, handle 76, is mounted at the other extremity of the guide members. Handle 75 is mechanically connected to a first cam retainer 77 and handle 76 is connected to a second cam retainer 78, as will be more completely described hereinafter. With the apparatus in the position of Figure 2, retainers 77 and 78 both engage cam section 61 of lever 60 and maintain levers 60 and 62 in the position shown, restraining them from movement under the influence of bias spring 65. Thus, brackets 57 and 58, base members 67 and 69, and the switches mounted thereon are held in a reference position as illustrated.

A more complete picture of the remainder of the apparatus of Figure 2 is given in Figure 4. As seen therein, handle 76 is connected to a first slide bar 80 which extends through the center of the apparatus between guide members 54, the position of cam retainer 78 near the center of slide bar 80 being indicated by dotted outline. Similarly, handle 75 is connected to a second slide bar 81 which carries cam retainer 77, also indicated in dotted outline. In Figure 4, the apparatus is illustrated in a somewhat different position than that of Figure 2, with handle 76 being pulled to the left so that retainer 78 no longer engages cam section 61; however, retainer 77 remains in engagement with the cam section and maintains it in the same position as shown in Figure 2. Slide bars 80 and 81 are supported for lateral movement parallel to guide members 54 by a pair of shafts 82 mounted in the guide members. Shafts 82 also support a plurality of code-determining members or bars 83 arranged in two groups 84 and 85, the code bar groups being separated from each other and from slide bars 80 and 81 and guide members 54 by a plurality of washers 86. The coupling between shafts 82 and code members 83 permits lateral movement of the code bars parallel to guide members 54, as will be more completely explained hereinafter.

Figure 5:
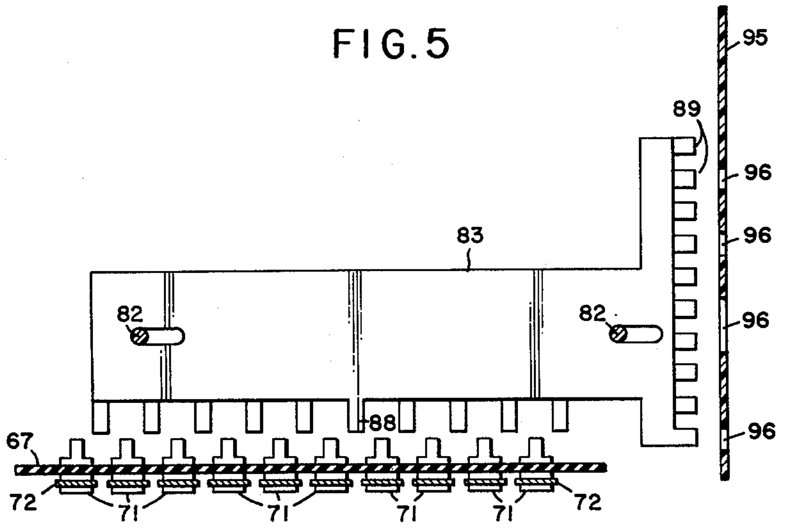
Figure 5 is a schematic side view of a portion of the apparatus shown in Figure 4, taken along line 5—5.

In Figure 5, taken along line 5—5 in Figure 4, it is seen that each of the code members 83 includes a projection 88 extending toward one of the switch actuators 71. It should be observed that there are ten of the code bar projections 88, which are individually associated with the ten code bars of group 85 and aligned with ten actuators 71 corresponding to the ten switches incorporated in transition apparatus **42*a* of Figure 1; projections 88 define a selected one of a first family of predetermined code patterns and are illustrated in a reference position in which, for the embodiment shown, they do not engage any of the switch actuators. In addition, each of the code bars 83 includes a second projection 89 extending from that end of the code member nearest handle 75**.

Returning to Figure 4, handle 75 includes a supporting bracket 91 in which are formed a pair of openings 92 corresponding in size to the external configuration of code bar groups 84 and 85 and indicated in dotted outline. In addition, a recess 93 is formed in the body of handle 75 itself. The configuration of handle 75 and bracket 91 is such that a space 94 is formed between these two members. Space 94 serves as a receptacle for a replaceable code element 95, shown in cross-sectional view in Figure 5. Code element 95 may comprise a stiff card formed from cardboard, a sheet of plastic, or any other suitable material. Card 95 is provided with a series of apertures 96 which define a selected one of a second family of predetermined code patterns, the pattern being determined by the apertures 96 aligned with particular ones of projections 89 of code bars 83. Again referring to Figure 4, it is seen that slide bar 80 includes a pair of reset members 98 and 99 which extend from slide bar 80 in position to engage code bar groups 84 and 85 respectively, as will be more completely described hereinafter.

The apparatus of Figures 2–5, as thus far described, may be considered to be in a reference position in all figures, insofar as the operating elements of the apparatus are concerned. Thus, in Figure 2, retaining members 77 and 78 overlap and engage cam section 61 to maintain levers 60 and 62 in the position shown. Levers 60 and 62, in turn, hold brackets 57 and 58 in the position shown and prevent any movement thereof due to the bias exerted by spring 65. The position of brackets 57, 58 maintains bases 67 and 69 in a position in which all of the switch actuators 71 mounted thereon remain free of any extraneous influence and are thus permitted to remain in their reference position as illustrated in Figure 3, corresponding to the normal switch positions shown in apparatus **42*a* of Figure 1. In Figure 4, code bars 83, switch actuators 71, bases 67, 69, and brackets 57, 58 all remain in the same position, since retainer 77 still engages cam section 61** and retains it in the position illustrated in Figure 2.

Figure 6:
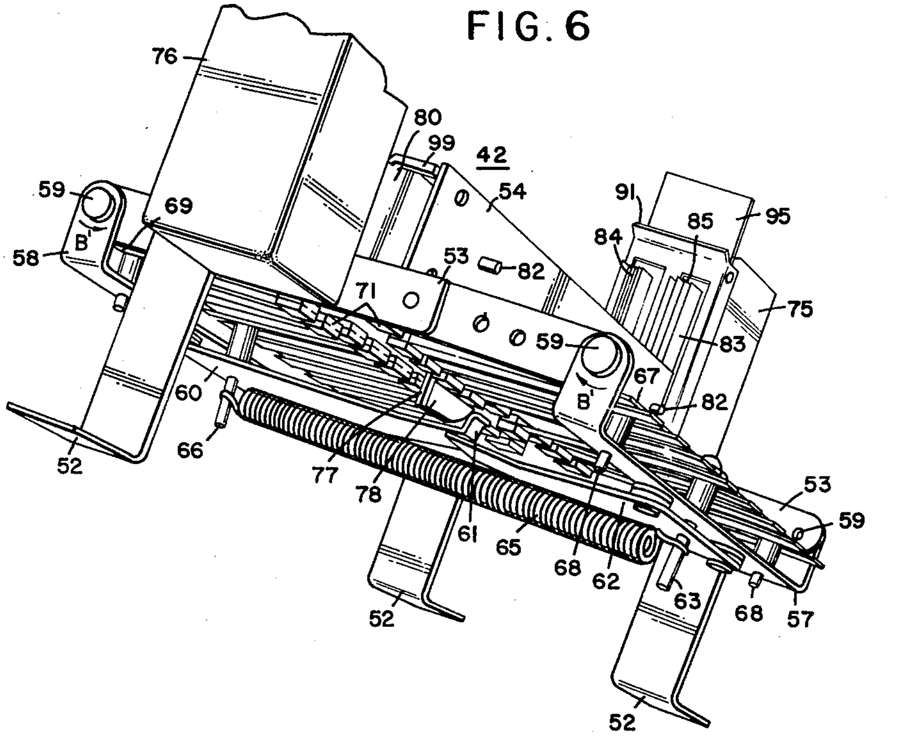
Figure 6 is a perspective view of the apparatus of Figure 1, shown in a different operating condition.
Figure 7:
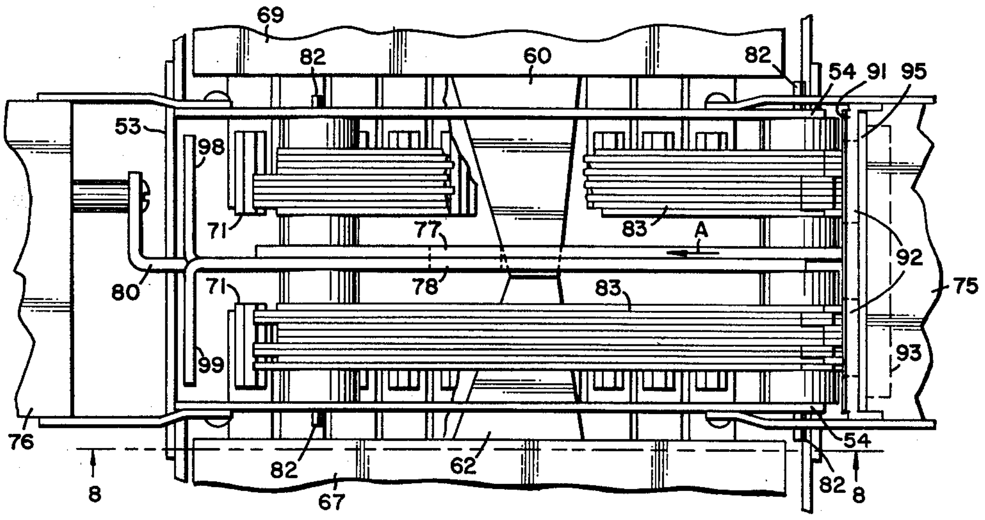
Figure 7 is a top view of the apparatus of Figure 6.
Figure 8:
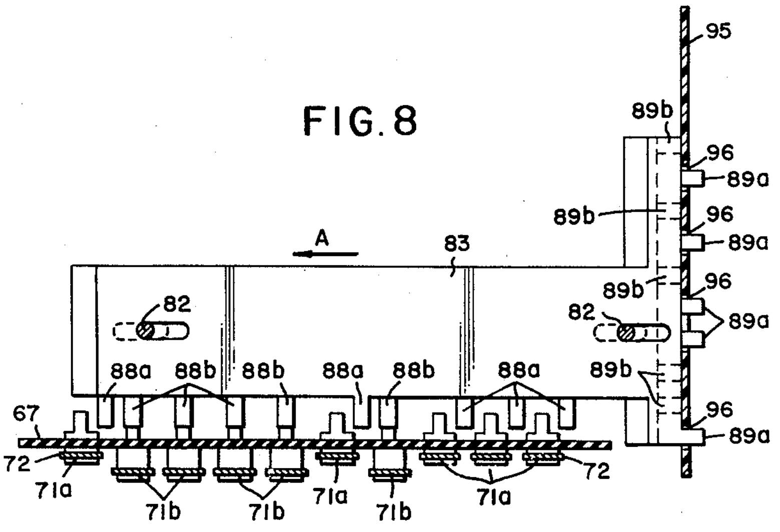
Figure 8 is a schematic side view of a portion of the apparatus of Figure 7, taken along line 8—8.

In order to effect a desired change in the operating condition of apparatus 42, handle 75 is moved in the direction indicated by arrow A in Figure 4 until it assumes the position illustrated in Figures 6–8. As seen in Figure 6, retainer 77 moves with handle 75 and is disengaged from cam section 61. When this occurs, levers 60 and 62 are released for movement toward code-determining members 83 and thus permit brackets 57 and 58 to pivot about pins 59 as indicated by arrows B and B′ respectively. This pivotal movement is effected through the biasing force exerted by spring 65. The pivotal movement of brackets 57, 58 imparts a corresponding movement to bases 67, 69 and switch actuators 71 are thus moved toward code bar projections 88.

The newly-established relative positions of the elements of apparatus 42 are indicated in Figure 7, in which it is seen that the movement of handle 75 in the direction of arrow A releases retainer 77 from cam section 61 and also moves bracket 91, code element 95 and recess 93 toward projections 89 of code bars 83. Referring to Figure 8, it is seen that a selected number of projections 89, which are aligned with openings 96 in code element 95 and which are marked **89*a*, extend through apertures 92 in bracket 91 and through code apertures 96 into recess 93; these code bars are not moved and their associated switch actuators 71*a* remain stationary with respect to base 67. However, those projections 89*b* which are not aligned with one of the apertures 96 are contacted by code element 95 and are moved in the direction of arrow A; this movement takes place before retainer 77 is released from engagement with cam section 61. The movement of selected ones of code bars 83 brings projections 88*b* into alignment with their associated switch actuators 71*b*. It thus becomes apparent that the code pattern defined by apertures 96 in replaceable code element 95 is superimposed upon the code pattern determined by the projections 88 of code bars 83**.

As the code bars reach the position shown in Figure 8, retainer 77 is disengaged from cam section 61 and brackets 57 and 58 pivot to move bases 67 and 69 toward the code bars, as described above. This brings switch actuators **71*b* into contact with their corresponding code bar projections 88*b*; the movement of actuators 71*b* is interrupted and they are moved from their normal reference position with respect to base 67 (Figure 3) to a second operating position. At the same time, the movement of actuators 71*a* with base 67 continues without interruption and the actuators reach the position shown without being moved relative to base 67 and without any change in operating condition. Accordingly, it is seen that the code patterns of card 95 and code members 83 conjointly determine which ones of the transition devices comprising switches 46 and 47 are actuated from their reference position and thus determine the circuit conditions established by apparatus 42 between output terminals 48 and input terminals 45** (Figure 1).

After a selected subscription television program is completed, or at any other time when it is desired to alter the circuit conditions established between terminals 45 and 48 of Figure 1, encoding apparatus 42 may be easily restored to its reference position. This is accomplished by moving handle 76 in a direction opposite to arrow A toward the position illustrated in Figure 2. The movement of handle 76 causes slide bar 80 to move in the same direction and brings retainer 78 into engagement with cam section 61; retainer 78 pushes the cam section against the bias exerted by spring 65 and thus brings levers 60 and 62 to their original reference position. Subsequently, projections 98 and 99 of slide bar 80 engage code bar groups 84 and 85 respectively and move code members 83 toward their reference position (Figure 4). In addition, the extremity of slide bar 80 opposite handle 76 engages bracket 91 and moves handle 75 to the position shown in Figure 4. This action removes card 95 from operative engagement with code bars 83 and permits all of the code bars to return to their reference position. Following this, handle 76 is again moved in the direction of arrow A to its inoperative position, as illustrated in Figure 4; this may be done manually or by use of a biasing spring associated with handle 76. This places the apparatus in its reference operating condition and permits removal of code card 95; the code card may then be replaced by a different code element so that another code pattern may be superimposed upon the apparatus.

Figure 9:
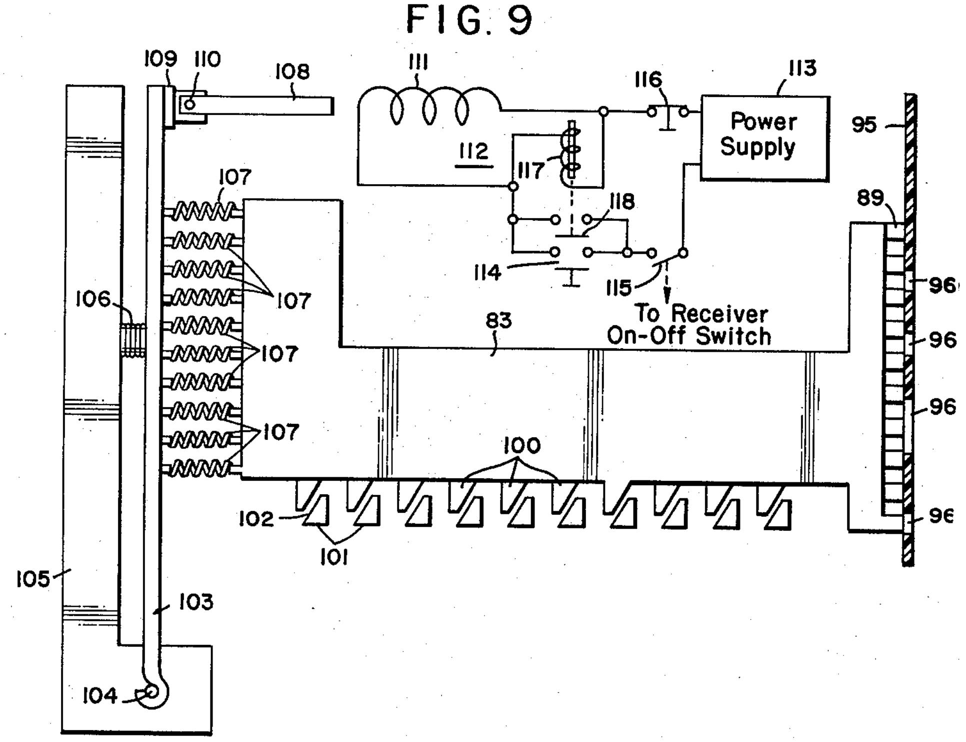
Figure 9 is a side view, partially schematic, of another embodiment of the invention.

The embodiment illustrated in Figure 9, which is closely analogous to Figure 5, comprises a plurality of code bars 83 generally similar to those illustrated in Figures 2–8. As before, code bars 83 include a plurality of projections 89 for engaging a code card 95. In addition, each of the code bars is provided with a cam element 100 and cam elements 100 are individually aligned with a plurality of switch actuators 101 which are generally similar to actuators 71 of the previously described embodiment except that each actuator 101 includes a cam surface 102. An actuating lever 103, pivotally mounted at pin 104, is aligned with code-determining members 83 at the end of the code bars opposite projections 89. Pin 104 is mounted on a suitable frame member 105, and a restoration spring 106 provides a resilient mechanical linkage between lever 103 and frame member 105. Lever 103 is individually resiliently coupled to each of code bars 83 by means of a plurality of springs 107, which, for the position shown, are in a relatively unstressed condition. A solenoid core 108 is pivotally mounted on lever 103 by means of a bracket 109 and a mounting pin 110; core 108 is suitably aligned with a solenoid coil 111 incorporated in a control circuit 112. One terminal of coil 111 is connected to a power supply 113 which may comprise the power supply of a subscription television receiver or any other suitable power source, through a normally-closed switch, pushbutton 116. The other terminal of coil 111 is coupled to power supply 113 through a momentary contact switch 114 and a maintained contact switch 115. Switch 114 may be one of any of the well known momentary contact types, usually actuated by a pushbutton, whereas switch 115 may be of any desired type suitable for ganging connection with the On-Off switch of a subscription television receiver. A holding relay, including solenoid 117 and holding contacts 118, is connected across coil 111, one of the contacts 118 being connected to each side of switch 114.

The apparatus of Figure 9 is shown in a position analogous to that of Figure 5, each of switch actuators 101 being established in a reference position independent of cam elements 100. Assuming that the receiver On-Off switch is moved to its "on" position, switch 115 is closed by virtue of its mechanical connection with the receiver switch. Pushbutton switch 114 is then closed, establishing a complete circuit connection between coil 111 and power supply 113 and at the same time energizing holding coil 117. Solenoid 117 closes contacts 118 and to maintain a complete circuit between power supply 113 and coil 111 when pushbutton 114 is released.

Figure 10:
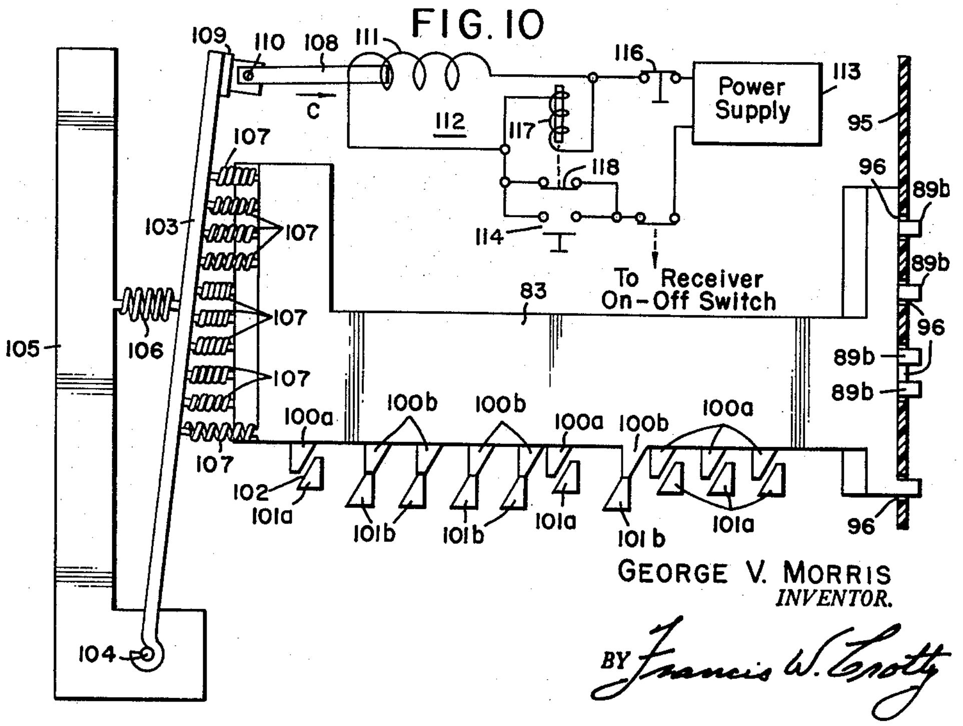
Figure 10 illustrates the apparatus of Figure 9 in a different operating condition.

After pushbutton 114 is released, the apparatus of Figure 9 is in the position shown in Figure 10. As seen therein, solenoid core 108 is moved, due to the energization of coil 111, in a direction indicated by arrow C; this movement causes lever 103 to pivot and to move against the bias of spring 106 toward code bars 83. Some of the code members 83 are unable to move due to the abutment of their respective projections 89 against code element 95 and the relative movement between these code bars and lever 103 is absorbed by the compression of their associated springs 107. However, selected ones of code bar projections 89, designated **89*b*, are aligned with apertures 96 in card 95 and thus permit movement of their associated code bars 83 in the direction of arrow C. The code bars associated with projections 89*b*, upon being moved, bring their associated cam elements 100*b* into engagement with switch actuators 101*b* and displace the switch actuators to a second operating position. Inasmuch as the remainder of the code bars, including cam elements 100*a*, remain in their reference position, their associated switch actuators 101*a*** remain unaffected.

Examination of control circuit 112 shows that the apparatus of Figure 10 is maintained indefinitely in the position shown and that code card 95 and code bars 83 conjointly determine the circuit conditions established between the input and output terminals of the switches associated with actuators 101, which may be considered as terminals 45 and 48 of encoding apparatus 42. However, when the subscription television receiver is de-energized, the ganging connection between switch 115 and the receiver on-off switch causes switch 115 to open, thus breaking the circuit between solenoid 111 and power source 113. The apparatus then returns to the position illustrated in Figure 9, this restoration being effected by the action of spring 106. Similarly, reset switch 116 may be opened, de-energizing solenoids 111 and 117 and restoring the receiver to its reference operating condition.

The two embodiments of the invention described above in Figures 2–8 and 9–10 individually comprise a first encoding device including code-determining members 83 and their associated projection or extension members which collectively define a selected one of a first family of predetermined code patterns and which are individually movable from their respective reference positions (Figures 2–6 and 9) to a second position (Figures 7–8 and 10) to selectively actuate a predetermined number of transition devices which, in the simplest case, comprise switches 46 and 47 (Figure 1). In addition, each of the embodiments includes a second encoding device for selectively moving the code-determining members in accordance with a predetermined one of a second family of code patterns which, in the embodiments shown, are established by means of replaceable code element 95. It will be obvious to those skilled in the art that the second code pattern may be selected in any one of a multiplicity of ways, perhaps the most obvious being by means of a plurality of pushbuttons individually mechanically coupled to code bar projections 89. The code pattern of the second encoding device is superimposed on that of the first encoding device, the two code patterns conjointly determining the circuit conditions established between the input and output terminals of a portion of the subscription television system. Furthermore, each of the embodiments includes a reset mechanism (handle 76 and slide bar 80 in the first embodiment and spring 106 and switches 115 and 116 in the second embodiment) for restoring the code bars to their reference position.

In either of the described embodiments, it may be desirable to mark or mutilate code card 95 to provide a positive indication that this element has been used. An additional code member similar to code bars 83 may be incorporated in the apparatus for marking purposes; the added member is provided with a suitable marking or cutting element to mutilate or otherwise deface code element 95.

The use of apparatus requiring modification of manipulation in accordance with two separate and distinct code patterns, as outlined above, makes it possible to construct a large number of subscriber receivers each incorporating means for decoding a suitable telecast but significantly dissimilar from other subscriber receivers which are capable of reproducing the same telecast. More specifically, the first code pattern, determined by code members 83 and their associated projections, represents only one of a family of several hundred patterns or combinations which may be permanently incorporated in different subscriber receivers. Each of these receivers would require modification in accordance with a different one of the second family of code patterns represented by card 95 in order to condition the receiver for useful operation, thus precluding any effective interchange of decoding information. Furthermore, the second code pattern, which must be superimposed upon the first in order to achieve intelligible operation, effectively precludes unauthorized conditioning of the decoding apparatus by "hunt-and-peck" methods, and provides an adequate degree of control with respect to reproduction of the coded telecast.

While particular embodiments of the present invention have been shown and described, it is apparent that changes and modifications may be made without departing from the invention in its broader aspects. The aim of the appended claims, therefore, is to cover all such changes and modifications as fall within the true spirit and scope of the invention.

I claim:

1. An encoding apparatus for a subscription television system including a plurality of input terminals and a plurality of output terminals, said encoding apparatus comprising: a plurality of transition devices, individually actuable from a first operating condition to a second operating condition, for selectively establishing a multiplicity of circuit conditions between said input terminals and said output terminals; a first encoding device including a plurality of code-determining members collectively defining a selected one of a first family of predetermined code patterns and individually movable from a reference position to a second position to selectively actuate a predetermined number of said transition devices; and means including a second encoding device for selectively moving a plurality of said code-determining members from said reference position to said second position in accordance with a selected one of a second family of predetermined code patterns, said code patterns of said first and second encoding devices conjointly determining the circuit conditions established between said input and output terminals during operating intervals in which any of said code-determining members has assumed its aforesaid second position.

2. An encoding apparatus for a subscription television system including a plurality of input terminals and a plurality of output terminals, said encoding apparatus comprising: a plurality of transition devices, individually actuable from a first operating condition to a second operating condition, for selectively establishing a multiplicity of circuit conditions between said input terminals and said output terminals; a first encoding device including a plurality of code-determining members collectively defining a selected one of a first family of predetermined code patterns and individually movable from a reference position to a second position to selectively actuate a predetermined number of said transition devices; and a second encoding device for simultaneously moving a predetermined plurality of said code-determining members from said reference position to said second position in accordance with a selected one of a second family of predetermined code patterns, said code patterns of said first and second encoding devices conjointly determining the circuit conditions established between said input and output terminals during operating intervals in which any of said code-determining members has assumed its aforesaid second position.

3. An encoding apparatus for a subscription television system including a plurality of input terminals and a plurality of output terminals, said encoding apparatus comprising: a plurality of transition devices, individually actuable from a first operating condition to a second operating condition, for selectively establishing a multiplicity of circuit conditions between said input terminals and said output terminals; a first encoding device including a plurality of code-determining members collectively defining a selected one of a first family of predetermined code patterns and individually movable from a reference position to a second position to selectively actuate a predetermined number of said transition devices; a second encoding device for simultaneously moving a predetermined plurality of said code-determining members from said reference position to said second position; and a replaceable code element incorporated in said second encoding device to condition said device for operation in accordance with a selected one of a second family of predetermined code paterns, said code patterns of said first and second encoding devices conjointly determining the circuit conditions established between said input and output terminals during operating intervals in which any of said code-determining members has assumed its aforesaid second position.

4. An encoding apparatus for a subscription television system including a plurality of input terminals and a plurality of output terminals, said encoding apparatus comprising: a plurality of transition devices, individually actuable from a first operating condition to a second operating condition, for selectively establishing a multiplicity of circuit conditions between said input terminals and said output terminals; a first encoding device including a plurality of code-determining members collectively defining a selected one of a first family of predetermined code patterns and individually movable from a reference position to a second position to selectively actuate a predetermined number of said transition devices; a second encoding device for simultaneously moving a predetermined plurality of said code-determining members from said reference position to said second position in accordance with a selected one of a second family of predetermined code patterns, said code patterns of said first and second encoding devices conjointly determining the circuit conditions established between said input and output terminals during operating intervals in which any of said code-determining members has assumed its aforesaid second position; and a reset mechanism for restoring said code-determining members to said reference position.

5. An encoding apparatus for a subscription television system including a plurality of input terminals and a plurality of output terminals, said encoding apparatus comprising: a plurality of transition switches, individually actuable from a first operating condition to a second operating condition, for selectively establishing a multiplicity of circuit conditions between said input terminals and said output terminals; a plurality of transposition switches, interconnected between said terminals and said transition switches and individually actuable from a first operating condition to a second operating condition, for transposing said terminal circuit conditions established by said transition switches; a first encoding device including a plurality of code-determining members collectively defining a selected one of a first family of predetermined code patterns and individually movable from a reference position to a second position to selectively actuate a predetermined number of said transition and transposition switches; and a second encoding device for selectively moving a plurality of said code-determining members from said reference position to said second position in accordance with a selected one of a second family of predetermined code patterns, said code patterns of said first and second encoding devices conjointly determining the circuit conditions established between said input and output terminals during operating intervals in which any of said code-determining members has assumed its aforesaid second position.

6. An encoding apparatus for a subscription television system including a plurality of input terminals and a plurality of output terminals, said encoding apparatus comprising: a plurality of transition switches, individually actuable from a first operating condition to a second operating condition, for selectively establishing a multiplicity of circuit conditions between said input terminals and said output terminals; a plurality of transposition switches, interconnected between said terminals and said transition switches and individually actuable from a first operating condition to a second operating condition, for transposing said terminal circuit conditions established by said transition switches; a first encoding device including a plurality of code-determining members collectively defining a selected one of a first family of predetermined code patterns and individually movable from a reference position to a second position to selectively engage and actuate a predetermined one of said transition or transposition switches; and a second encoding device for selectively moving a plurality of said code-determining members from said reference position to said second position in accordance with a selected one of a second family of predetermined code patterns, said code patterns of said first and second encoding devices conjointly determining the circuit conditions established between said input and output terminals during operating intervals in which any of said code-determining members has assumed its aforesaid second position.

7. An encoding apparatus for a subscription television system including a plurality of input terminals and a plurality of output terminals, said encoding apparatus comprising: a plurality of transition devices, individually actuable from a first operating condition to a second operating condition, for selectively establishing a multiplicity of circuit conditions between said input terminals and said output terminals; a first encoding device comprising a corresponding plurality of code bars, individually movable from a reference position to a second position, and a corresponding plurality of code projections individually associated with said code bars to selectively actuate a predetermined one of said transition devices in response to movement of each of said code bars from said reference position to said second position, said code projections collectively defining a selected one of a first family of predetermined code patterns; a second encoding device for simultaneously moving a predetermined plurality of said code bars from said reference position to said second position; and a replaceable code element incorporated in said second encoding device to condition said device for operation in accordance with a selected one of a second family of predetermined code patterns, said code patterns of said first and second encoding devices conjointly determining the circuit conditions established between said input and output terminals during operating intervals in which any of said code bars has assumed its aforesaid second position.

References Cited in the file of this patent

UNITED STATES PATENTS

| | | |
|---|---|---|
| 2,124,160 | Wheelock | July 19, 1938 |
| 2,361,859 | Mallina | Oct. 31, 1944 |
| 2,364,446 | Hubbard | Dec. 5, 1944 |
| 2,437,255 | Hogan | Mar. 9, 1948 |
| 2,472,774 | Mayle | June 7, 1949 |
| 2,501,274 | Hamilton | Mar. 21, 1950 |
| 2,526,694 | Samet | Oct. 24, 1950 |
| 2,528,161 | Miloche | Oct. 31, 1950 |
| 2,539,556 | Steinberg | Jan. 30, 1951 |
| 2,605,965 | Shepard | Aug. 5, 1952 |
| 2,636,398 | Lens | Apr. 28, 1953 |